United States Patent
Okayama et al.

(10) Patent No.: US 11,195,436 B2
(45) Date of Patent: Dec. 7, 2021

(54) ORGAN MODEL FOR CATHETER SIMULATOR

(71) Applicants: OSAKA UNIVERSITY, Suita (JP); JMC CORPORATION, Yokohama (JP); FUYO CORPORATION, Nishitokyo (JP)

(72) Inventors: Keita Okayama, Suita (JP); Yasushi Sakata, Suita (JP); Daichi Watanabe, Yokohama (JP); Makoto Inada, Yokohama (JP); Munekuni Sato, Nishitokyo (JP)

(73) Assignees: OSAKA UNIVERSITY, Suita (JP); JMC CORPORATION, Yokohama (JP); FUYO CORPORATION, Nishitokyo (JP)

( * ) Notice: Subject to any disclaimer, the term of this patent is extended or adjusted under 35 U.S.C. 154(b) by 343 days.

(21) Appl. No.: 16/384,131

(22) Filed: Apr. 15, 2019

(65) Prior Publication Data
US 2019/0244544 A1    Aug. 8, 2019

Related U.S. Application Data

(63) Continuation-in-part of application No. PCT/JP2017/038892, filed on Oct. 27, 2017.

(30) Foreign Application Priority Data

Oct. 28, 2016  (JP) .............................. JP2016-211217
Jun. 28, 2017  (JP) .............................. JP2017-126366

(51) Int. Cl.
G09B 23/34   (2006.01)
G09B 23/32   (2006.01)
(Continued)

(52) U.S. Cl.
CPC ............... *G09B 23/34* (2013.01); *G09B 9/00* (2013.01); *G09B 23/303* (2013.01); *G09B 23/32* (2013.01); *G09B 23/286* (2013.01)

(58) Field of Classification Search
CPC ........ G09B 23/34; G09B 9/00; G09B 23/303; G09B 23/32; G09B 23/286
(Continued)

(56) References Cited

U.S. PATENT DOCUMENTS 9,965,591 B2    5/2018  Christiansen et al.
2006/0027741 A1*  2/2006  Faber .................... G09B 23/28
250/252.1

(Continued)

FOREIGN PATENT DOCUMENTS

CN    1588489 A    3/2005
CN    203276696 U    11/2013
(Continued)

OTHER PUBLICATIONS

Europe Patent Office, "Search Report for European Patent Application No. 17864048.8," dated Jan. 30, 2020.
(Continued)

*Primary Examiner* — Michael C Grant
(74) *Attorney, Agent, or Firm* — Manabu Kanesaka (57) ABSTRACT

An organ model for a catheter simulator is formed from elastic materials, and a heart model for a catheter simulator includes a main body of heart and coronary arteries laid along the surface of the main body of heart, in which a portion of the coronary arteries is attachable and detachable.

24 Claims, 5 Drawing Sheets

(51) Int. Cl.
  *G09B 23/30* (2006.01)
  *G09B 9/00* (2006.01)
  *G09B 23/28* (2006.01)

(58) Field of Classification Search
  USPC .......................................................... 434/267
  See application file for complete search history.

(56) References Cited

U.S. PATENT DOCUMENTS

| | | |
|---|---|---|
| 2007/0218437 A1 | 9/2007 | Lotano et al. |
| 2007/0269784 A1* | 11/2007 | LaFrance ............... G09B 23/34 434/272 |
| 2009/0246747 A1 | 10/2009 | Buckman, Jr. |
| 2012/0028231 A1* | 2/2012 | Misawa .................. G09B 23/30 434/267 |
| 2013/0196301 A1 | 8/2013 | Carson et al. |
| 2014/0106329 A1 | 4/2014 | Watanabe et al. |
| 2014/0370477 A1* | 12/2014 | Black ..................... G09B 23/34 434/272 |
| 2014/0370490 A1* | 12/2014 | Iaizzo ................... A01N 1/0247 435/1.2 |
| 2016/0027345 A1* | 1/2016 | Carson .................... G09B 23/30 434/262 |
| 2016/0262634 A1* | 9/2016 | Steen .................... A01N 1/0247 |
| 2017/0103682 A1 | 4/2017 | Okayama et al. |
| 2017/0278431 A1* | 9/2017 | Brenner ............... G09B 23/303 |
| 2018/0018904 A1 | 1/2018 | Okayama et al. |

FOREIGN PATENT DOCUMENTS

| | | | |
|---|---|---|---|
| EP | 2772897 | A1 | 9/2014 |
| JP | 2008-237304 | A | 10/2008 |
| JP | 2011-027794 | A | 2/2011 |
| JP | 2011-027795 | A | 2/2011 |
| JP | 2011-064918 | A | 3/2011 |
| JP | 2011-164918 | A | 8/2011 |
| JP | 2014-021174 | A | 2/2014 |
| JP | 2015-64487 | A * | 4/2015 |
| JP | 2015-064487 | A | 4/2015 |
| JP | 6120305 | B2 | 4/2017 |
| WO | 2005/037111 | A2 | 4/2005 |
| WO | 2013/040195 | A2 | 3/2013 |
| WO | 2016/075732 | A1 | 5/2016 |
| WO | 2016/158222 | A1 | 10/2016 |

OTHER PUBLICATIONS

China Patent Office, "Office Action for Chinese Patent Application No. 201780058327.6," dated Nov. 25, 2020.

Europe Patent Office, "Office Action for European Application No. 14906024.6," dated Sep. 30, 2019.

PCT/ISA/210, "International Search Report for International Application No. PCT/JP2017/038892," dated Jan. 23, 2018.

* cited by examiner

ORGAN MODEL FOR CATHETER SIMULATOR

CROSS-REFERENCE TO RELATED APPLICATION

This is a continuation in part application of PCT International Application No. PCT/JP2017/038892 filed on Oct. 27, 2017, which claims priorities of Japanese Patent Applications No. 2016-211217 filed on Oct. 28, 2016; and No. 2017-126366 filed on Jun. 28, 2017, the disclosure of which is incorporated herein.

TECHNICAL FIELD

The present invention relates to an organ model used for a catheter simulator.

BACKGROUND ART

Conventionally, in the medical settings, a method of inserting a catheter through an artery of an arm or a leg and bringing the catheter to an organ is used for the purpose of performing an examination or a treatment for an organ such as heart. With regard to this catheter manipulation, various simulators have been proposed to promote acquisition and mastery of the operation techniques. In addition to training by means of computerized simulators, in recent years, simulators with which a training practice more closely resembling the actual feeling of catheter operation can be realized, have been suggested.

The inventors of the invention have suggested in Patent Document 1 a catheter simulator that realizes a training practice closer to the actual clinical practice with a more convenient configuration. Specifically, as a coronary blood flow (blood flow in the coronary arteries) in the same direction as in the case of performing an actual cardiac catheter operation is reproduced by suppressing the unnatural flow of a simulated blood (liquid) occurring in the coronary arteries, a training practice closely resembling the actual clinical practice is enabled. Furthermore, component parts (an electronic valve, a pressure sensor, an electronic valve controller, and the like) necessary for causing a heart model to pulsate have been reduced as much as possible, foreign materials that do not exist in an actual clinical condition are not likely to be projected under X-ray illumination, and a convenient configuration that does not essentially require an X-ray imaging system (training by visual observation is also enabled) is realized.

The catheter simulator according to Patent Document 1 has a container filled with a liquid; an elastic heart model that is installed in the container in a state of being filled with a liquid, and is provided with coronary arteries and an aorta; and a pump that is connected to an apex section of the heart model and generates a pulsatile flow from the apex section toward the aorta using the liquid.

The heart model is formed from an elastic material, and when a pulsatile flow flows from the apex section side toward the aorta, a liquid is supplied into the coronary arteries by means of a heartbeat similar to that of a human heart. At this time, the heart model is characterized in that an unnatural flow, which is not observable in the human body, does not occur in the main body of heart and the coronary arteries, and a coronary blood flow (blood flow in the coronary arteries) in the same direction as that in the case of performing an actual cardiac catheter operation is realized.

CITATION LIST

Patent Document

Patent Document 1: PCT/JP2014/079683

SUMMARY OF THE INVENTION

Problem to be Solved by the Invention

Through this invention, a simulation resembling closer to the actual clinical practice is realized with a more convenient configuration; however, since the above-mentioned heart model (also including simulated blood vessels other than the heart, which are connected to the heart) has a simulated organ and simulated blood vessels integrally formed without any artificial seams, inconveniences may occur at the time of performing a simulation.

Specifically, catheter surgery for a coronary artery is intended for both the left coronary artery and the right coronary artery, and the site of occurrence and the degree of progress of stenosis, occlusion, and the like also vary depending on the patient. In order to carry out a simulation equivalent to the actual clinical practice, it is preferable to use a heart model that simulates a case, such as a model in which a portion of the blood vessel of a coronary artery is intentionally formed narrowly, and a stenosed state is reproduced. However, in order to reproduce a variety of diseased states, it is necessary to prepare heart models with a large number of variations. Therefore, even in a case in which design modification of only a portion of the coronary artery is needed, the entire heart model needs to be formed again, and at the time of use, an operation of replacing the entire heart model is required. Therefore, there has been room for improvements in many aspects such as the production cost of the heart model, the storage space, and the operation efficiency.

Furthermore, in the related art technologies, even in a case in which after completion of training, a stent (metal cylinder) and the like placed in a coronary artery by a simulation are removed, and the heart model is returned to the initial state (state before the simulation), since the heart model and simulated blood vessels are integrally formed, there is a problem that the operation of removing a stent and the like unavoidably becomes difficult.

Usually, in a catheter simulation for stenosis, occlusion, and the like of a coronary artery, a treatment or the like of introducing a catheter into the coronary artery to reach a diseased site, subsequently causing a guide wire to enter, and placing a stent along the guide wire, is carried out. In an actual surgical operation, the stent thus placed is left to stand even after the operation; however, in a simulation, it is required to remove the placed stent after completion of the training, return the heart model to the initial state, and prepare the heart model for the next training. It is the current circumstances that since a coronary artery is fine and has a complicated shape, and a stent is placed so as to endure the daily life activities by closely adhering to the inner surface of a coronary artery such that the stent expands the inner surface of this coronary artery in the diameter direction, a stent cannot be removed easily.

The invention was achieved by paying attention to the problems described above, and it is an object of the invention to provide an organ model for a catheter simulator, in which a portion of a simulated organ or a portion of a simulated blood vessel is attachable and detachable.

Means for Solving Problem

In order to achieve the objects described above, the organ model for a catheter simulator of the invention has a feature that the organ model is formed using elastic materials, and a portion of a simulated organ or a portion of a simulated blood vessel in the model is attachable and detachable.

The simulated organ described above corresponds to a model obtained by molding (for example, molding by means of a mold) an organ such as brain or heart in the human body so as to approximate the structure such an organ using elastic materials. Similarly, a simulated blood vessel corresponds to a model obtained by molding a blood vessel so as to approximate the structure of a blood vessel in the human body.

In a case in which the organ model is a heart model, for example, when only a portion of a coronary artery (hereinafter, referred to a coronary artery part) is attachable and detachable, a plurality of coronary artery parts having different extents of stenosis, occlusion, and the like of the coronary artery can be prepared for the heart model, and by exchanging these coronary artery parts according to the purpose of the simulation, simulations reproducing various extents of progress and patient-specific conditions can be carried out conveniently. Furthermore, when a plurality of sites where a coronary artery part is exchangeable is provided in the coronary artery, many simulation patterns can be realized by means of combinations of coronary artery parts and sites for exchange, and therefore, conditions conforming to various cases can be reproduced. That is, simulations can be conveniently realized in accordance with various cases and patient-specific conditions, and compared to a case in which the entire heart model should be exchanged by mounting and dismounting as in the case of related art technologies, streamlining can be achieved in many aspects such as the production cost, storage space, and operation efficiency.

Furthermore, after completion of training, when a stent or the like placed in a coronary artery is removed by a simulation, since every coronary artery part where a stent is placed is made removable, a stent can be manually taken out easily from the relevant coronary artery part, and thus the maneuverability of the trainee can be markedly enhanced.

Similarly, in a case in which the organ model is a brain model, a portion of a cerebral blood vessel is made attachable and detachable; in a case in which the organ model is an abdominal blood vessel model, a portion of an abdominal blood vessel is made attachable and detachable; and in a case in which the organ model is a lower limb blood vessel model, a portion of a lower limb blood vessel is made attachable and detachable. Thereby, streamlining can be achieved in many aspects such as the production cost, storage space, and operation efficiency, compared to a case in which the entire organ model is exchanged by mounting and dismounting, and when a stent or the like placed inside a blood vessel by a simulation is removed, maneuverability of the trainee can be markedly enhanced.

Effect of the Invention

When the organ model for a catheter simulator of the invention is used, a portion of a simulated organ or a portion of a simulated blood vessel is made attachable and detachable. Thereby, simulations in accordance with various cases and patient-specific conditions can be carried out more conveniently.

BRIEF DESCRIPTION OF DRAWINGS

FIG. 3 shows diagrams illustrating an embodiment of the heart model according to the invention, and FIG. 3(A) is an overall perspective view, while

FIG. 4 shows longitudinal cross-sectional views of the vicinity of a mounting unit of a coronary artery where a coronary artery part is mounted and dismounted, and FIG. 4(A) shows a state in which a coronary artery part has been removed, while FIG. 5 shows longitudinal cross-sectional views illustrating an embodiment of an auxiliary part according to the invention, and FIG. 5(A) shows a state before inserting an auxiliary part into the inner side of a normal model part (a coronary artery part that realizes an ordinary blood flow), while

MODE(S) FOR CARRYING OUT THE INVENTION

In the following description, an embodiment of the organ model according to the invention will be explained by taking a heart model as an example, with reference to the drawings.

Figure 1:
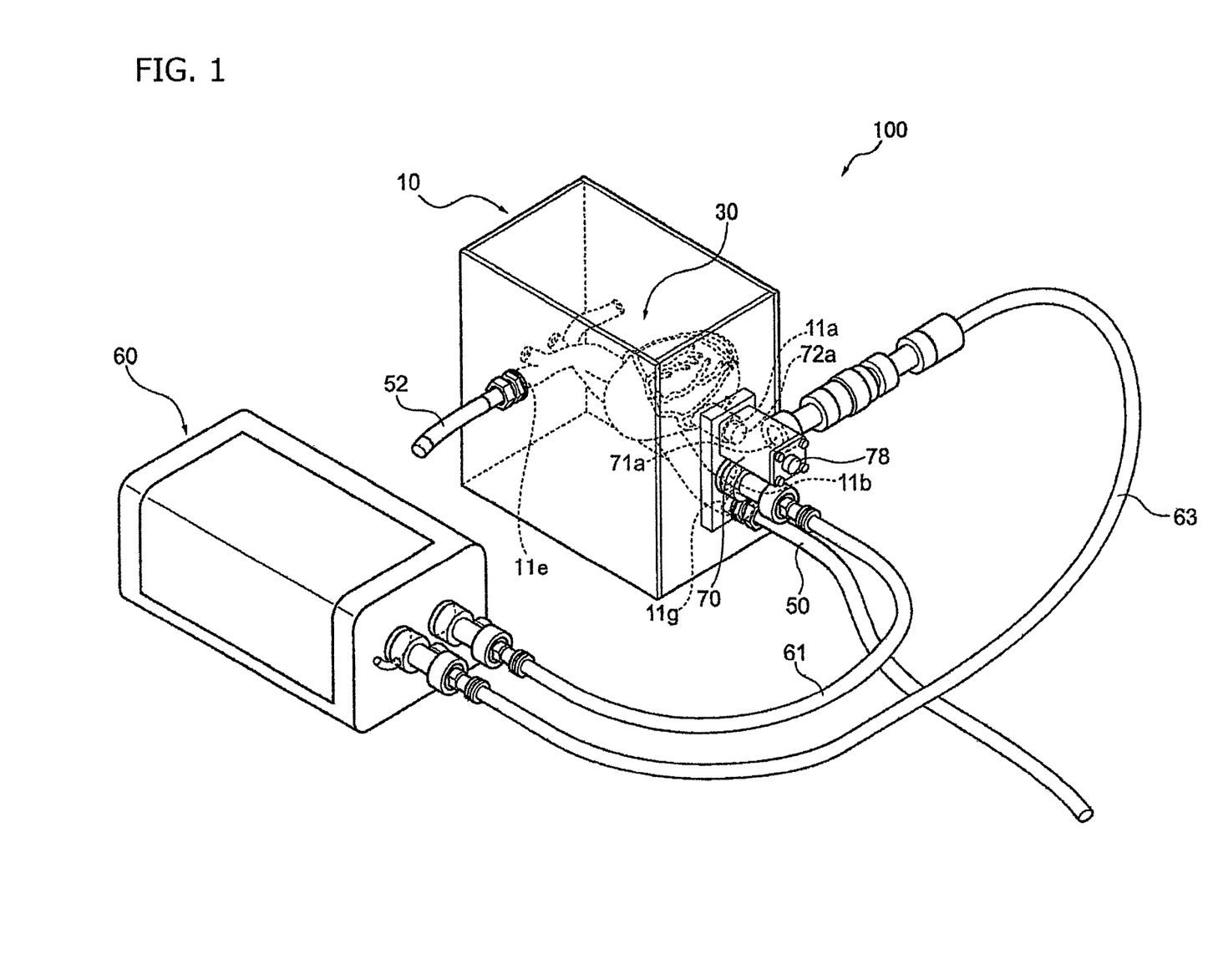
FIG. 1 is an overall perspective view of a catheter simulator illustrating one form of use of a heart model according to the invention.

FIG. 1 is an overall perspective view of a catheter simulator illustrating one form of use of a heart model according to the invention. First, forms of use of a catheter simulator and a heart model will be described with reference to FIG. 1.

The catheter simulator 100 illustrated in FIG. 1 has a container 10 that is filled with a liquid; a heart model 30 that is installed in the container in a state of being filled with a liquid; and a pulsatile flow-producing pump 60 (hereinafter, referred to as pump 60) that causes a liquid to flow into the heart model 30 and also draws in the liquid that has passed through the heart model 30 and is discharged into the container 10.

The pump 60 is connected to the container 10 through a suction tube 61 and an extrusion tube 63. As shown in the diagram, the container 10 is formed into a rectangular parallelepiped shape (capacity is about 6 L) with the upper side being opened, and on one of the side walls, a discharge port 11b and an inlet port 11a are formed. At the discharge port 11b, a communicating hole is formed so that a liquid can pass therethrough, and the discharge port 11b is connected to the suction tube 61 of the pump 60. When the pump 60 is operated, the liquid inside the container 10 is drawn from the discharge port 11b into the pump 60 through the suction tube 61.

In FIG. 1, a two-way cock 70, which is a tube with its interior being bifurcated, is connected between the inlet port 11a and the extrusion tube 63. The two-way cock 70 includes a container-side opening 72a that is connected to the inlet port 11a of the container 10; a pump-side opening 71a that is connected to the extrusion tube 63; and one end 78 that allows introduction of a catheter. At the inlet port 11a, a communicating hole that is in communication with the container-side opening 72a of the two-way cock 70 and allows a liquid to pass therethrough is formed, and the extrusion tube 63 is connected to the pump-side opening 71a of the two-way cock 70. When the pump 60 is operated, the liquid extruded from the pump 60 (pulsatile flow) passes through the pump-side opening 71a and the container-side opening 72a and arrives at the inlet port 11a. At the inlet port 11a, as will be described below, an opening 31a of the apex section of the heart model 30 is connected, and the liquid that has passed through the inlet port 11a flows into the heart model 30 installed in the container 10.

The one end 78 of the two-way cock 70 can be used as a catheter inlet tube that will be described below. As the two-way cock 70 is connected to the inlet port 11a, inflow of a pulsatile flow and introduction of a catheter can both be realized through one opening (inlet port 11a) as such. Meanwhile, the two-way cock 70 is not necessarily needed, and the inlet port 11a may be configured to be proximately separated into two sites, with one of the sites being used for the connection of the extrusion tube 63 (inflow of pulsatile flow), and the other site being used for the introduction of a catheter. Furthermore, in a case in which catheter introduction through the inlet port 11a is unnecessary, or the like, the two-way cock 70 may be omitted, and the inlet port 11a and the extrusion tube 63 may be directly connected, similarly to the connection of the discharge port 11b and the suction tube 61 as described above. In FIG. 1, the discharge port 11b and the inlet port 11a are installed together on one side wall; however, it is not necessary that the discharge port 11b and the inlet port 11a are formed on one side wall.

On the side walls of the container 10, connection units 11g and 11e for connecting the inlet tubes 50 and 52, through which a catheter operated by a trainee is introduced from the outside of the container 10, are formed. At the connection units 11g and 11e, communicating holes for inserting a catheter are formed. The positions of the connection units 11g and 11e can be changed according to the simulation or the heart model, and also, the number of the connection units is not limited to two.

Inside the container 10, a heart model 30 that serves as an object of simulation is installed in a state of being filled with a liquid. It is desirable that the liquid is easily handleable and has visible transmissibility and X-ray transmissibility; however, there are no particular limitations. It is general to use water, or water mixed with a solvent.

The heart model 30 is installed inside the container 10 by being inserted into holding protrusions provided at the inlet port 11a and the connection unit 11g. The holding protrusions are such that the tips are formed in a tapered form (not illustrated in the diagram) so as to protrude toward the inner surface of the container 10, and by plugging in the edges of the heart model 30 into the holding protrusions, the heart model 30 can be connected easily to the container 10, while the heart model 30 can be retained in a state of floating in the liquid. As the heart model 30 is in a floating state, the trainee may obtain a feeling that more closely resembles an actual clinical condition at the time of catheter operation.

Meanwhile, the method for installing the heart model 30 is not limited to a method of plugging in the heart model 30 into the holding protrusions provided at the inlet port 11a and the connection unit 11g, and any configuration in which the heart model 30 can be installed so as to be in a state of floating in the liquid charged into the container 10, may be employed. For example, a configuration in which the heart model 30 is installed by means of the holding protrusion of the connection unit 11e described above, or a holder for exclusive use is provided inside the container 10, and the heart model 30 is installed using the holder, may also be employed.

As described above, when the container 10 filled with a liquid, the heart model 30, the pump 60, the suction tube 61, and the extrusion tube 63 are connected, and the pump 60 is operated, a pulsatile flow produced in the pump 60 passes through the extrusion tube 63 and the inlet port 11a, flows into the heart model 30, passes through the heart model 30, subsequently flows out through the opening of the heart model 30 into the container 10, and returns to the pump 60 through the discharge port 11b and the suction tube 61. The trainee introduces a catheter through the connection units 11g and 11e or through the one end 78 of the two-way cock 70, in a state in which a liquid (pulsatile flow) circulates in the catheter simulator 100 as such, and performs a simulation.

Figure 2:
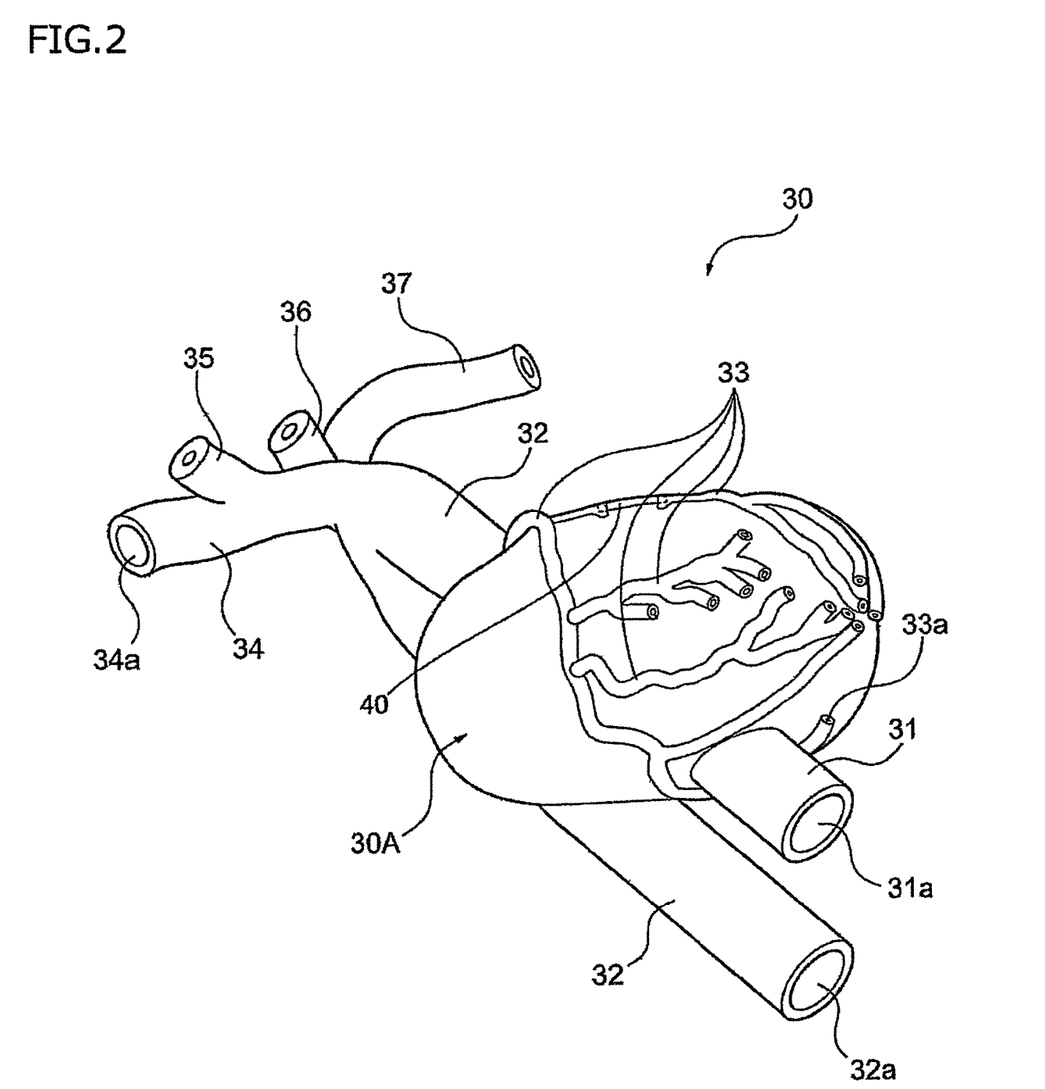
FIG. 2 is a diagram illustrating the heart model according to the invention, which is used for the simulator of FIG. 1.

Next, using FIG. 2, an embodiment of the heart model 30 according to the invention, which is used for the catheter simulator of FIG. 1, will be explained. For the heart model 30, it is preferable to use a material that has elasticity close to that of the actual human heart and is transparent so that after a catheter is inserted, the movement of the catheter can be understood, the material having X-ray transmissibility. For example, the heart model 30 can be formed using PVA (polyvinyl alcohol), polyurethane, an epoxy resin, an unsaturated polyester, a phenolic resin, a silicone, or a material similar to any of these, or a thermosetting resin or a thermoplastic resin other than those, singly or in combination of a plurality thereof. Meanwhile, even in a case in which the heart model is produced with a material that is visible to the trainee, when the container 10 is covered with a cover or the like so that the heart model cannot be seen, or when the heart model is transilluminated with X-rays and is displayed on a monitor or the like, the behavior of the catheter can be understood only through the monitor.

The organ model according to the invention has at least a simulated organ or simulated blood vessels. The heart model 30 of the present embodiment has, as illustrated in FIG. 2, the main body of heart 30A, which is a simulated organ simulating the human heart; and various simulated blood vessels of the coronary arteries 33 laid along the surface of the main body of heart, the aorta 32 connected to the heart, and blood vessels around the heart (right subclavian artery 34, common carotid arteries 35 and 36, and left subclavian artery 37). Furthermore, the heart model 30 is provided with an inflow tube 31 that does not exist in the human body but is intended for causing a liquid sent from the pump 60 to flow in.

The human heart includes right atrium, right ventricle, left atrium, and left ventricle; however, the main body 30A does not include such an internal structure, and the interior forms a cavity. The main body 30A may include the entirety or a portion of the internal structure of the human heart, depending on the type, purpose, and the like of simulation. For example, when a structure including an aorta and an aortic valve in the interior is adopted, a catheter simulation such as transcatheter aortic valve implantation (TAVI) can be carried out.

On the head side of the main body 30A, an aorta 32 is installed, as in the case of the human heart. Furthermore, at the apex section formed on the tail side of the main body 30A, an inflow tube (edge) 31 is provided. The inflow tube 31 does not exist in the human body; however, in the present embodiment, the inflow tube 31 serves as a path for causing a liquid sent from the pump 60 (pulsatile flow) to flow into the main body 30A. The liquid that has flowed into the main body 30A through the inflow tube 31, passes through the interior of the cavity with certain directionality and arrives at the aorta 32 by an intact flow.

On the surface of the main body 30A, a large number of coronary arteries 33 having a fine and complicated shape are formed, as in the case of human heart. The coronary arteries 33 are branched from the root of the aorta 32 and are installed so as to be laid along the surface of the main body 30A. In the present embodiment, the discharge port 33a is formed at the proximal region of the coronary arteries 33, and the liquid that has flowed into the coronary arteries 33 is discharged out of the heart model 30 through the discharge port 33a.

It is preferable that a simulated body of a blood vessel that is connected to the aorta in the human body is installed on the path to the aorta 32. Thereby, the trainee can perform a simulation in a condition that more closely resembles an actual clinical condition. In the present embodiment, the simulated blood vessels illustrated in FIG. 2, specifically, right subclavian artery 34, common carotid arteries 35 and 36, and left subclavian artery 37 are provided similarly to the human body.

When the heart model 30 having the above-described configuration is installed as shown in FIG. 1, and the pump 60 is operated, the liquid extruded from the pump 60 (pulsatile flow) passes through the opening 31a and flows into the main body 30A (inner cavity) of the heart model 30. A portion of the liquid thus flowed in flows into the coronary arteries 33 through the root of the aorta 32, while the remaining portion flows along the aorta 32.

The liquid that has flowed into the coronary arteries 33 is discharged out of the heart model 30 through the discharge port 33a provided at the tip of the coronary arteries 33, and joins with the liquid filling the container 10. Meanwhile, the liquid that flows along the aorta 32 is discharged into the container 10 through the common carotid arteries 35 and 36 and the left subclavian artery 37, which are blood vessels provided on the path of the aorta 32, and joins with the liquid filling the container 10. The liquid discharged into the container 10 through the respective tip openings of the coronary arteries 33, common carotid arteries 35 and 36, and left subclavian artery 37 flows out through the discharge port 11b and circulates to the pump 60.

Next, the invention will be explained using the heart model 30, which is an example of the invention, and a coronary artery part 40, with reference to FIG. 3 and FIG. 4. FIG. 3 is a diagram illustrating an embodiment of the heart model 30 according to the invention, and FIG. 3(A) is an overall perspective view as viewed from the head side of the heart, while FIG. 3(B) is a magnified explanatory diagram of a portion where a coronary artery part is mounted and dismounted.

Figure 3A:
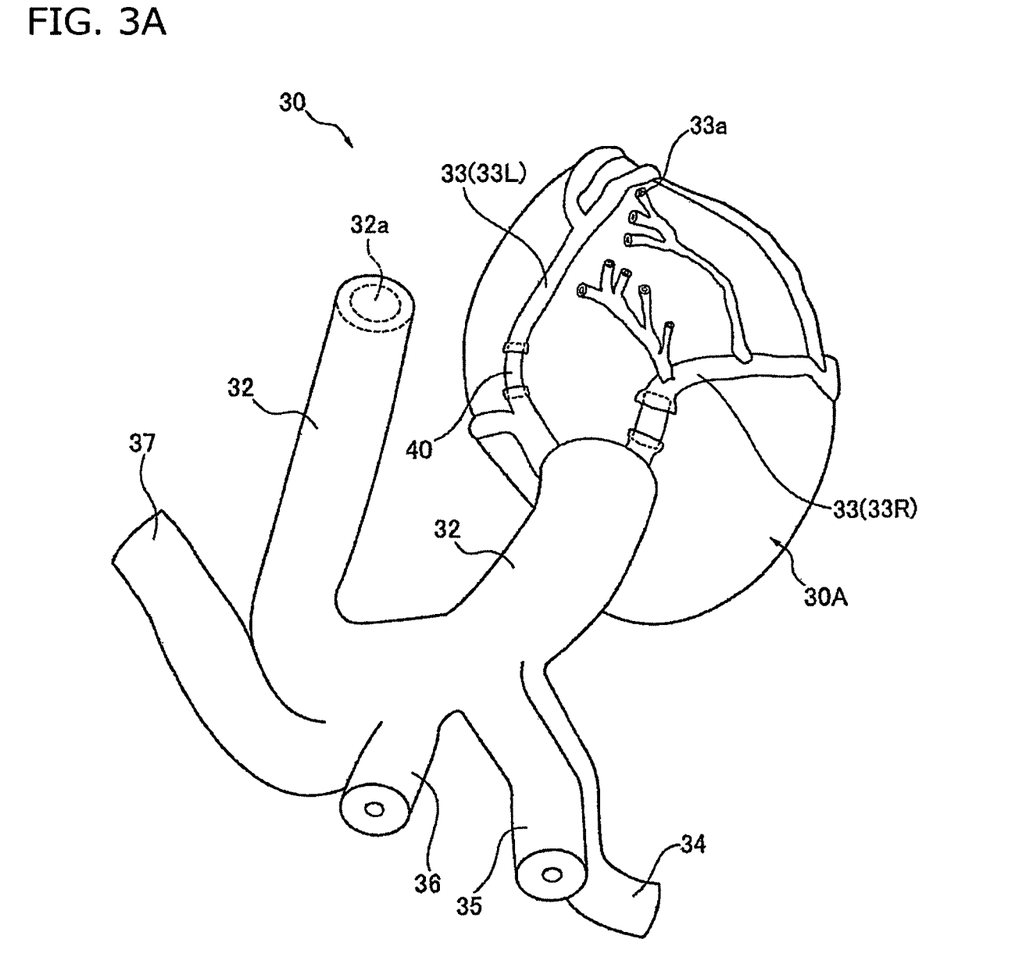

As shown in FIG. 3(A), the coronary arteries 33 of the heart model 30 are composed of right coronary artery 33R and left coronary artery 33L, similarly to the human body, and portions of these are made attachable and detachable. This attachable and detachable portion of a coronary artery is the coronary artery part 40. Meanwhile, without being limited to the coronary artery, an attachable and detachable portion of a simulated blood vessel will be referred to as vascular part.

Figure 3B:
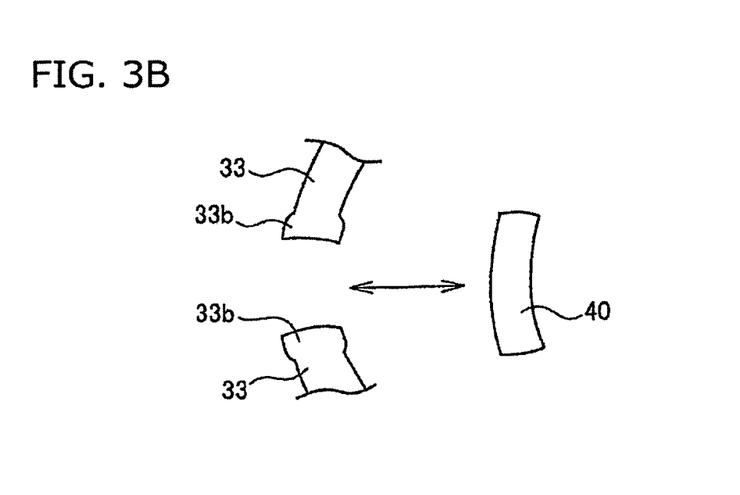
FIG. 3(B) is a magnified explanatory diagram of a portion in which a coronary artery part is mounted and dismounted.

As shown in FIG. 3(B), the coronary artery 33 at the portion where the coronary artery part 40 is mounted and dismounted has two edges 33b, and when the coronary artery part 40 formed as a separate body is plugged into these two edges 33b, the coronary artery part 40 can be fixed in a mounted state. The two edges 33b can be provided at one or more sites at any position on the coronary arteries 33, and a coronary artery part 40 having a (longitudinal) length L40 and a size corresponding to that site can be arbitrarily designed. Stenosis, occlusion or the like of a coronary artery in the actual clinical practice becomes important at a place close to the root side that is connected to the aorta 32 in many cases. Therefore, in the present embodiment, as illustrated in FIG. 3(A), the coronary artery part is formed at a position close to the root of the right coronary artery 33R and the left coronary artery 33L. Furthermore, depending on the patient, a patient may have lesions at a plurality of sites, and therefore, the coronary artery part 40 may be made attachable and detachable at a larger number of sites, without having the place for the coronary artery part limited to the two sites shown in FIG. 3(A).

Figure 4A:
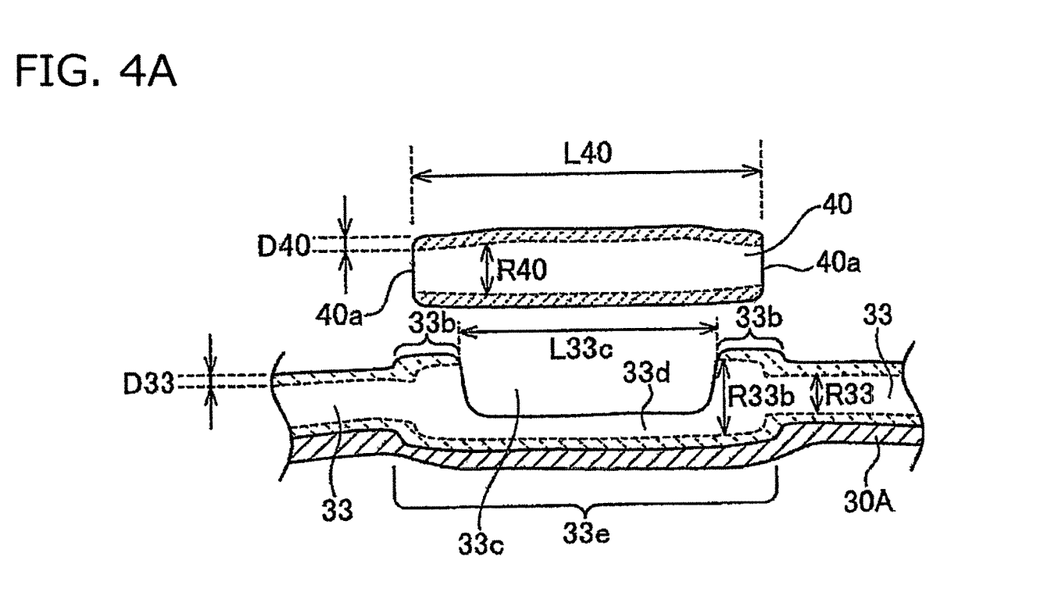
Figure 4B:
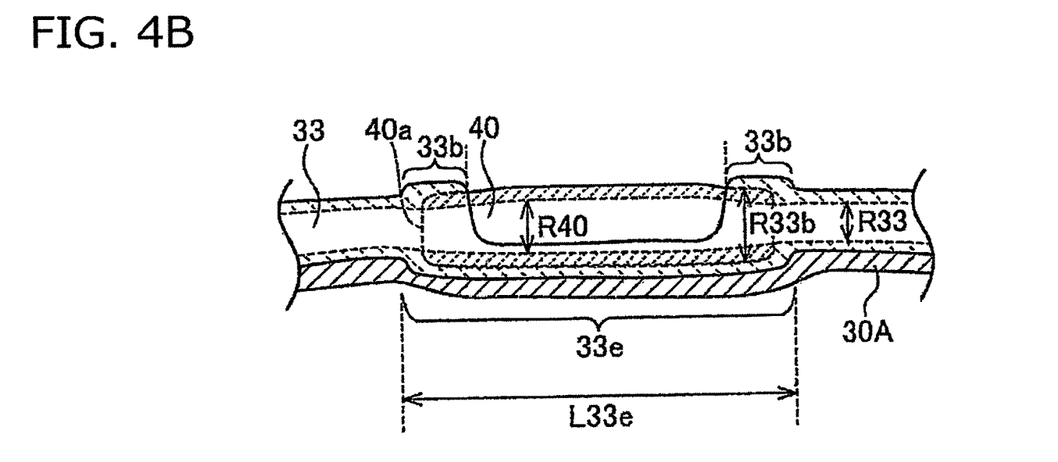
FIG. 4(B) shows a state in which a coronary artery is mounted.

FIG. 4 shows longitudinal cross-sectional views of the coronary artery part 40 and the vicinity of the mounting unit 33e of the coronary artery 33 where the same part is mounted and dismounted. The coronary artery 33 is formed on the side wall of the heart model main body 30A, and FIG. 4(A) shows a state in which the coronary artery part 40 has been removed, while FIG. 4(B) shows a state in which the coronary artery part 40 is mounted. The coronary artery part 40 is formed from an elastic material similar to that of the coronary artery 33, and has an opening 40a at the two ends. Thereby, when the coronary artery part 40 is mounted as shown in FIG. 4(B), the interior of the coronary artery part 40 is in communication with the interior of the coronary artery 33, and a liquid that forms a simulated blood flow can pass through the coronary artery part 40.

As shown in FIG. 4(A), the mounting unit 33e has, at the two ends, an edge 33b that serves as a connection unit to the coronary artery part 40, and between the edges 33b, a portion of the upper section and the lateral section on the upper section of the coronary artery 33 is made into an opening 33c. In FIG. 4, the opening 33c is formed so as to leave side sections 33d of the coronary artery 33 between the opening and the heart model main body 30A, and the edges 33b are continued by the side sections 33d. Thereby, when the coronary artery part 40 is connected, the coronary artery part 40 can be stably fixed and retained. Meanwhile, it is not necessarily essential that this portion that continues between the edges 33b is positioned at the side sections 33d, and the portion may be a portion of the outer wall of the coronary artery 33, such as the bottom or the upper section. Furthermore, in a case in which the coronary artery part 40 can be stably fixed and retained only along the two edges 33b, the portion that continues between the edges 33b is not necessarily needed.

As illustrated in FIG. 4, the diameter of the inner surface (inner diameter) R33b of the edge 33b is larger than the inner diameter R33 of the coronary artery 33 that is joined to the edge. Thereby, when the coronary artery part 40 is mounted as shown in FIG. 4(B), the inner diameter R40 of the coronary artery part 40 can be made to approximately coincide with the R33, and the generation of a level difference near the opening 40a can be suppressed. In a case in which a liquid passes through the interior, the occurrence of unnatural flow of the liquid near the opening 40a, a defective flow of the liquid caused by resistance, or hindering of the passage of a catheter-related device such as a guide wire, a stent, or a balloon catheter, can be prevented (the coronary artery part 40 that realizes such an ordinary blood flow will be hereinafter referred to as "normal model part").

In a case in which the length L40 of the coronary artery part 40 is smaller than the length of the opening 33c (distance between the edges 33b) L33c, a gap is produced between the two ends of the coronary artery part 40 and the mounting unit 33e, and the liquid is leaked. Furthermore, in a case in which the length L40 is larger than the length L33e of the mounting unit 33e, the coronary artery part 40 reaches to the outer side of the edges 33b that serve as connection units. Therefore, there occurs a problem that the coronary artery part 40 cannot be smoothly mounted. Therefore, it is preferable that the length L40 is formed to be shorter than or equal to the length L33e, and longer than or equal to the length of opening 33c, the length L33C.

Furthermore, the outer diameter of the coronary artery part 40 is formed to be equal to or slightly larger than the inner diameter R33b of the edges of the mounting unit 33e, in a state in which the coronary artery part 40 has been removed as shown in FIG. 4(A). Thereby, as illustrated in FIG. 4(B), when the coronary artery part 40 is mounted in the mounting unit 33e, the inner surface of the edges 33b of the mounting unit 33e elastically adheres closely to the outer surface of the coronary artery part 40.

By employing such a configuration, the coronary artery part 40 can be mounted such that the coronary artery part 40 and the mounting unit 33e elastically adhere closely to each other, and in a case in which a liquid passes through the interior of the coronary artery part 40 and the mounting unit 33e that are in communication, the occurrence of an unnatural flow of the passing liquid and a defective flow of the liquid in the vicinity of the opening 40a of the coronary artery part 40 can be prevented without having any leaking of the liquid. That is, the coronary artery part can be made attachable and detachable, while the flow of the liquid (blood flow) is maintained in a state closely resembling an actual clinical condition.

On the other hand, when a case in which a coronary artery 33 has stenosis, occlusion or the like is reproduced, the inner diameter R40 of the coronary artery part 40 is partially made smaller (reproducing stenosis) or made larger (reproducing swelling), or a gradient is applied to the inner surface, or convexities simulating thrombi are formed in a portion of the inner surface. Furthermore, when the side wall (portion corresponding to the vascular wall) of the coronary artery part 40 is made into a multiple structure with a double or higher structure, and a gap is purposely provided in the vascular wall, dissociation of the coronary artery can be reproduced. Thereby, a flow different from the normal state can be produced in the liquid that passes therethrough, and thus, the coronary artery part can be made attachable and detachable while the liquid flow (blood flow) is reproduced into a state closely resembling that of a patient in an actual clinical condition (such a coronary artery part 40 that realizes a blood flow different from the normal state will be hereinafter referred to as "lesion model part").

Furthermore, in a case in which the heart model 30 and the coronary artery part 40 are formed from a material having X-ray transmissibility, a simulation can be carried out even under X-ray illumination; however, in this case, for example, when an X-ray opaque material is applied and laminated on the inner surface of the coronary artery part 40, a shadow is produced at the portion of application and lamination under X-ray illumination, and a condition in which a portion of the coronary artery has been calcified can be reproduced (such a coronary artery part 40 that reproduces calcification will be hereinafter referred to as "calcification model part").

Furthermore, in a case in which a simulation of placing a stent inside a coronary artery part 40 is carried out, the thickness D40 of the side wall of the coronary artery part 40 may be made thinner than the thickness D33 of the side wall of the coronary artery 33, according to the type, material, and the like of the stent. Regarding the stent, there are available a stent employing a system that is formed from a shape memory alloy, expands at a temperature close to the body temperature (30° C. to near 40° C.), and is placed so as to extend the inner diameter of the coronary artery, and the like. However, there are occasions in which, because the hardness of the coronary artery 33 is too high, the stent cannot expand smoothly, or the shape of the stent becomes curved and distorted. In order to solve this, when the hardness is decreased by reducing the thickness D33 of the side wall of the coronary artery 33, there occurs a problem that the shape of the coronary artery 33 itself may not be maintained. In order to solve such a problem, when only the thickness D40 of the coronary artery part 40 is reduced, the stent can be expanded without difficulties inside the coronary artery part 40, while the shape of the coronary artery 33 is maintained.

In the coronary artery part 40, a diseased portion such as a stenosed state may be formed singly as described above; however, diseased portions can also be formed easily as follows by combining a plurality of members. An embodiment of this combination of a plurality of members will be explained by taking an example of an auxiliary part 44 that is used as inserted in the coronary artery part 40, with reference to FIG. 5.

Figure 5A:
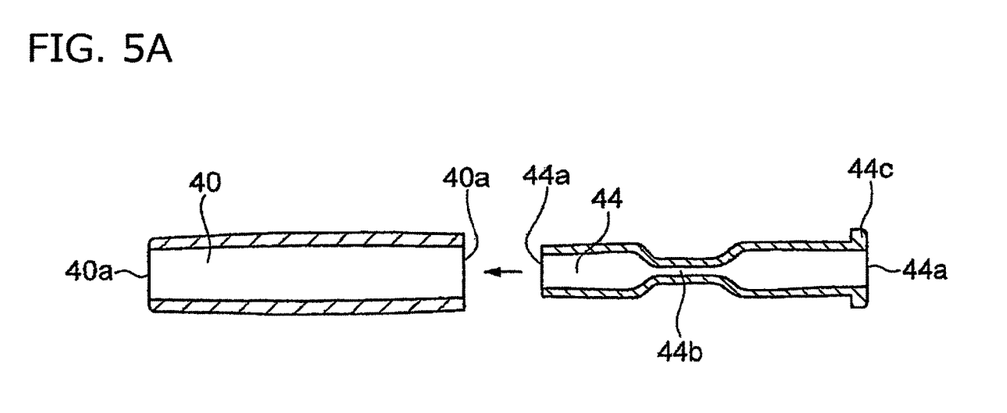
Figure 5B:
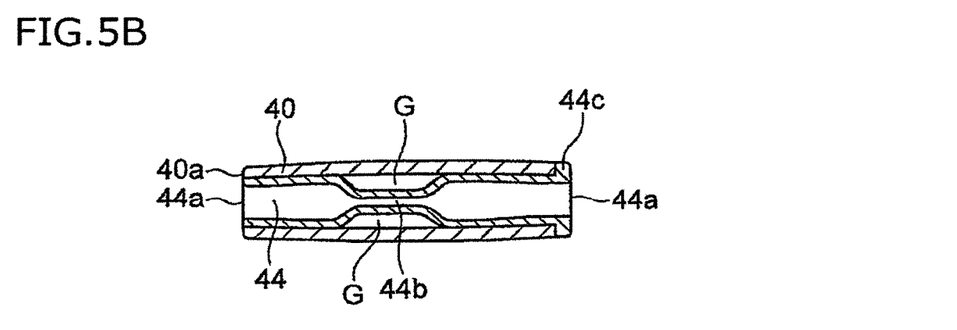
FIG. 5(B) shows a state in which an auxiliary part has been inserted.

FIG. 5(A) is a longitudinal cross-sectional view illustrating the state in which an auxiliary part 44 is being inserted into the inside of the normal model part (coronary artery part 40 that realizes an ordinary blood flow), and FIG. 5(B) is a longitudinal cross-sectional view illustrating the state in which the auxiliary part 44 has been inserted.

As shown in the diagram, the auxiliary part 44 is a tubular body having an opening 44a at both ends, and in the longitudinally central region of the tubular body, a diseased portion 44b that has been narrowed by making the diameter smaller than the diameters of other regions is formed. Furthermore, the auxiliary part 44 is formed from an elastic material such that the largest outer diameter is approximately equal to or slightly larger than the inner diameter of the coronary artery part 40. When such an auxiliary part 44 is inserted through the opening 40a of the coronary artery part 40 as shown in FIG. 5(A), the outer surface other than the diseased portion 44b of the auxiliary part 44 and the inner surface of the coronary artery part 40 elastically adhere closely to each other as shown in FIG. 5(B), and a gap G is produced between the outer surface of the diseased portion 44b and the inner surface of the coronary artery part 40. Meanwhile, it is preferable that the auxiliary part 44 is formed from a sufficiently thin material compared to the coronary artery part 40 so that a stent can expand easily. Furthermore, when a material that is harder than the material for forming the coronary artery part 40 is used as the material for forming the auxiliary part 44, even with a thinner shape, an operation of inserting the auxiliary part 44 can be carried out easily.

When the auxiliary part 44 is inserted into a coronary artery part 40, the coronary artery part 40 is mounted in a heart model 30, and a liquid that serves as a simulated blood is caused to flow into the heart model 30, the liquid that passes through the coronary artery part 40 passes through the auxiliary part 44 placed therein. That is, by combining a coronary artery part 40 (normal model part) with a diseased portion 44b of an auxiliary part 44 and producing a multiple structure, a condition different from the normal condition can be produced, similarly to the diseased model part in which the coronary artery part 40 itself has a diseased portion. In the present example, a double structure obtained by combining parts has been mentioned; however, for example, these may be integrally formed, or a multiple structure with a triple or higher structure may also be used.

As described above, when a diseased portion 44b is reproduced by inserting an auxiliary part 44 into a normal model part, for example, in the case of performing a simulation of placing a stent, there is an advantage that expansion of the stent is achieved more easily. As shown in FIG. 5(B), a gap G is produced between the inner surface of the coronary artery part 40 and the diseased portion 44b, and the liquid that flows into the heart model 30 flows into this gap G and is stored therein. Therefore, when a stent is placed at the diseased portion 44b of the auxiliary part 44, since there exists the liquid that has filled the gap G on the outer side of the diseased portion 44b, as the stent is expanded, the liquid is pressurized. This pressurized liquid flows out from the space between the outer surface of the auxiliary part 44 and the inner surface of the coronary artery part 40 to the outside of the coronary artery part 40. Thereby, the stent expands easily, and the inner diameter at the diseased portion 44b of the auxiliary part 44 is extended. Therefore, the expansion of a blood vessel occurring along with stent placement in an actual surgical operation is reproduced. Meanwhile, the gap G may be filled with air or a resilient material.

Furthermore, when a device such as a stent or a balloon catheter is passed, a portion or the entirety of the coronary artery part 40 and the auxiliary part 44 may be adhered together so that these parts do not slip off from each other. At this time, since it becomes difficult for the liquid of the gap G to escape, a small hole or a slit may be provided at the coronary artery part 40 or the auxiliary part 44 (not illustrated in the diagram). Meanwhile, the provision of a small hole or a slit does not depend on the presence or absence of adhesion between the coronary artery part 40 and the auxiliary part.

In the embodiment described above, the diseased portion 44b of the auxiliary part 44 is formed in the longitudinally central region of the tubular body; however, the place of formation is not limited to the central region. Furthermore, the diseased portion 44b of the auxiliary part 44 is not limited to stenosis where the diameter has been narrowed to be small, and the diseased portion 44b may be a reproduction of a symptom other than stenosis. For example, dissection of a coronary artery can be reproduced by providing a gap between the coronary artery part 40 and an auxiliary part.

Furthermore, the coronary artery part 40 into which an auxiliary part 44 is inserted is not limited to the normal model part described above. For example, when an auxiliary part 44 reproducing stenosis is inserted into the calcification model part described above, a symptom in which both calcification and stenosis have occurred can be easily reproduced.

In the auxiliary part 44 according to the present embodiment, as illustrated in FIG. 5, a flange 44c protruding outward (diameter direction) is formed along the circumferential direction at one of the edges. When the auxiliary part 44 is inserted through the opening 40a of an edge of the coronary artery part 40, as the flange 44c comes into contact with the edge, progress of insertion is stopped, and the auxiliary part 44 can be placed at a predetermined position. Furthermore, when the auxiliary part 44 is removed from the coronary artery part 40, the flange 44c can be grabbed and pulled out. As such, position adjustment in the longitudinal direction and mounting and dismounting of the auxiliary part 44 in the coronary artery part 40 are facilitated by the flange 44c; however, the flange 44c is not necessarily needed.

It is not necessarily needed to coincide the longitudinal length of the auxiliary part 44 according to the present embodiment with the longitudinal length of the coronary artery part 40. For example, by making one end or both ends of the auxiliary part 44 longer than the coronary artery part 40, the gap between the coronary artery part 40 and the coronary artery 33 is made smaller, and leaking of a liquid can be prevented. In addition, stability at the time of mounting of the coronary artery part 40 can be enhanced.

For the purpose of position adjustment in the circumferential direction of the auxiliary part 44 to the coronary artery part 40, a cutout portion (not illustrated in the diagram) may be formed in a portion of an edge of the coronary artery part 40, and a protrusion (not illustrated in the diagram) that is engaged with the cutout portion may be formed in a portion on the outer surface of the auxiliary part 44, or combined shapes may be integrally formed from the beginning.

By having a variety of coronary artery parts 40 formed and prepared as such, various simulations can be carried out by using one heart model 30. For example, in FIG. 3(A), a simulation can be carried out using the normal model part for the coronary artery part 40 of the left coronary artery 33L and using the diseased model part for the coronary artery part 40 of the right coronary artery 33R, and then a simulation can be carried out by replacing the coronary artery part 40 of the left coronary artery 33L with a calcification model part. Thus, a plurality of combinations of simulations can be conveniently realized by varying the combination of the type of the coronary artery part 40 and the position of the mounting unit 33e. Here, in the coronary artery part 40, a diseased portion may be formed with the coronary artery part singly as described above, or a diseased portion may be formed with a plurality of members by combining the coronary artery part 40 with an auxiliary part 44 or the like. Furthermore, combined shapes may be integrally formed from the beginning.

Next, the flow of a catheter simulation performed using a heart model 30 having the above-described coronary artery part 40 will be explained. As explained for FIG. 1, a catheter simulator 100 is installed, subsequently a liquid is circulated, and training of catheter operation is initiated in a state in which a blood flow in the heart model 30 has been generated as explained for FIG. 2.

In the present embodiment, two kinds of simulations can be carried out, namely, the case of inserting a catheter through an artery of an arm and the case of inserting a catheter through an artery of the groin region. In a case in which the trainee simulates catheter insertion through an artery of an arm, the catheter passes by way of right subclavian artery 34 by means of an inlet tube 52 and reaches the aorta 32. Subsequently, when the catheter is further inserted, the catheter passes through the inside of the aorta 32 and is positioned at the inlet port of the coronary artery 33 (corresponding to the coronary ostium), which is branched near the connection unit to the main body 30A. At this time, the trainee identifies the ostium while observing the coronary artery 33 that becomes the object of insertion (object of treatment) between the left and right coronary arteries, and performs an operation so that the catheter is engaged with the target coronary ostium. Under X-ray illumination, the trainee engages a catheter while looking for the coronary ostium, by making use of an imaging agent or the like according to an actual clinical procedure. Subsequently, a guide wire that is needed for treatment is moved forward to the distal portion of a target site, that is, a site in need of treatment (coronary artery part 40), and a training according to actual catheter examination and surgical operation (coronary angiography and coronary angioplasty), such as vasodilation by means of a balloon catheter or stent placement, is carried out along the guide wire.

On the other hand, in a case in which the trainee simulates catheter insertion through an artery of the groin region, a catheter is introduced through the caudal tip (portion corresponding to the groin region) of the aorta 32 by means of an inlet tube 50. The catheter passes through the inside of the aorta 32 and arrives at the inlet port of a coronary artery 33 installed near the connection unit between the aorta 32 and the main body 30A. In this case, the introduction path of the catheter is only the route through the aorta 32; however, since a bifurcation point between the common carotid arteries 35 and 36 and the left subclavian artery 37 exists on the route, on the occasion of operating the catheter, a training of reaching the catheter to the inlet port corresponding to the coronary ostium while checking the positional relation with various simulated blood vessels and the like, can be carried out. The trainee can carry out a training of catheter examination and surgical operation by moving the catheter forward to the coronary artery part 40 that is in need of treatment, similarly to the case of performing through a blood vessel of an arm as described above.

After completion of the simulation, the coronary artery part 40 is removed from the mounting unit 33e of the heart model 30, and in a case in which a stent has been placed, the stent can be manually removed from the coronary artery part 40. Subsequently, when a coronary artery part 40 is attached to the mounting unit 33e, the next simulation can be carried out immediately.

As described above, when the coronary artery part 40 described above is used, a plurality of patterns of cardiac catheter skills can be trained more conveniently and continuously. Furthermore, since the heart model 30 and the coronary artery part 40 described above can be produced on the basis of CT images of actual patients, or on the basis of individual cases, pre-operative simulation can be carried out for each and every case.

Thus, with regard to embodiments of an organ model for a catheter simulator according to the invention, examples of the case of a heart model have been disclosed. However, the invention is not intended to be limited to the embodiments described above, and various modifications can be added to the extent that maintains the gist of the invention. For example, the pump 60 is not necessarily needed upon the use of the invention, and a more convenient simulation may be carried out by blocking the communicating hole for a liquid formed on a side wall of the container 10, and introducing a catheter simply in a state in which the heart model 30 is installed in the container 10 filled with a liquid. Furthermore, it is possible to apply the organ model to a cerebral blood vessel, a thoracoabdominal blood vessel, blood vessels of the limbs, and the like.

EXPLANATIONS OF LETTERS OR NUMERALS

10 CONTAINER FOR CATHETER SIMULATOR
11a INLET PORT
11b DISCHARGE PORT
11e, 11g CONNECTION UNIT
30 HEART MODEL (ORGAN MODEL)
30A MAIN BODY OF HEART (SIMULATED ORGAN)
31 INFLOW TUBE
33 CORONARY ARTERY (SIMULATED BLOOD VESSEL)
40 CORONARY ARTERY PART (VASCULAR PART)
40a OPENING OF CORONARY ARTERY PART
44 AUXILIARY PART
44b DISEASED PORTION
44c FLANGE
60 PULSATILE FLOW-PRODUCING PUMP
100 CATHETER SIMULATOR

The invention claimed is:

1. An organ model for a catheter simulator, the organ model comprising:
a simulated organ having a simulated blood vessel, which is formed from an elastic material,
wherein the simulated blood vessel includes a mounting portion, and a vascular part,
the vascular part is attached to and detached from the simulated blood vessel,
the vascular part has two ends with openings,
the two ends of the vascular part are connected to the mounting portion of the simulated blood vessel,
the mounting portion of the simulated blood vessel includes ends which become connecting portions relative to the vascular part such that the simulated blood vessel is partly connected between the ends of the mounting portion when the vascular part is removed from the simulated blood vessel, and
a distance between the ends of the mounting portion is shorter than a distance of the vascular part.

2. The organ model for a catheter simulator according to claim 1, wherein the elastic material has X-ray transmissibility, and
the simulated blood vessel includes an X-ray opaque portion.

3. The organ model for a catheter simulator according to claim 1, wherein when the two ends of the vascular part are connected to the mounting portion of the simulated blood vessel, an inner diameter of portions other than the vascular part in the simulated blood vessel approximately coincides with an inner diameter of the vascular part.

4. The organ model for a catheter simulator according to claim 1, wherein the mounting portion of the simulated blood vessel has, at the two ends, an edge serving as a connection unit to the vascular part, and
an inner surface of the edge is elastically adhered closely to an outer surface of the edge of the vascular part.

5. The organ model for a catheter simulator according to claim 1, wherein a thickness of a side wall of the vascular part is thinner than a thickness of a side wall of a portion other than the vascular part in the simulated blood vessel.

6. The organ model for a catheter simulator according to claim 1, wherein the simulated organ is a heart model,
the heart model has a main body of heart and coronary arteries laid along a surface of the main body of heart, and
the vascular part is a coronary artery part.

7. The organ model for a catheter simulator according to claim 6, wherein the heart model has an aorta protruding toward an interior of the main body of heart; and an aortic valve positioned at a tip of the aorta.

8. The organ model for a catheter simulator according to claim 1, wherein a portion corresponding to a vascular wall of the vascular part has a multiple structure with a double or higher structure.

9. The organ model for a catheter simulator according to claim 1, further comprising an auxiliary part, the auxiliary part being a tubular body to be inserted inside the vascular part.

10. The organ model for a catheter simulator according to claim 9, wherein the auxiliary part has a diseased portion formed therein, the diseased portion having a smaller diameter than other regions, and
in a state of having the auxiliary part inserted inside the vascular part, a gap is formed between an outer surface of the diseased portion and an inner surface of the vascular part.

11. The organ model for a catheter simulator according to claim 10, wherein at least one of the auxiliary part or the vascular part includes a hole or a slit continuing from a gap formed between the outer surface of the diseased portion and the inner surface of the vascular part, or the small hole and the slit.

12. The organ model for a catheter simulator according to claim 9, wherein a flange protruding in a diameter direction along a circumferential direction is formed in any one of edges of the auxiliary part.

13. The organ model for a catheter simulator according to claim 1, wherein the vascular part includes convexities simulating thrombi in a portion of the inner surface of the vascular part.

14. The organ model for a catheter simulator according to claim 1, wherein an inner diameter of the inner surface of the vascular part is partially enlarged.

15. The organ model for a catheter simulator according to claim 1, wherein an inner diameter of the vascular part is partially made small.

16. An organ model for a catheter simulator, the organ model comprising:
a simulated organ having a simulated blood vessel, which is formed from an elastic material,
wherein the simulated blood vessel includes a mounting portion, and a vascular part,
the vascular part is attachable to and detachable from the simulated blood vessel,
the vascular part has two ends with openings,
the two ends of the vascular part are connected to the mounting portion of the simulated blood vessel,
the simulated blood vessel further includes an auxiliary part having a tubular shape and inserted into the vascular part,
the auxiliary part includes a diseased portion having a diameter smaller than a diameter of other portions, and
a gap is formed between an outer portion of the diseased portion and an inner portion of the vascular part in a condition where the auxiliary part is disposed inside the vascular part, the gap being configured to be filled with a liquid in the simulated blood vessel.

17. The organ model for a catheter simulator according to claim 16, wherein the elastic material has X-ray transmissibility, and
the simulated blood vessel includes an X-ray opaque portion.

18. The organ model for a catheter simulator according to claim 16, wherein when the two ends of the vascular part are connected to the mounting portion of the simulated blood vessel, an inner diameter of portions other than the vascular part in the simulated blood vessel approximately coincides with an inner diameter of the vascular part.

19. The organ model for a catheter simulator according to claim 16, wherein the mounting portion of the simulated blood vessel has, at the two ends, an edge serving as a connection unit to the vascular part, and
an inner surface of the edge is elastically adhered closely to an outer surface of the edge of the vascular part.

20. The organ model for a catheter simulator according to claim 16, wherein a thickness of a side wall of the vascular part is thinner than a thickness of a side wall of a portion other than the vascular part in the simulated blood vessel.

21. The organ model for a catheter simulator according to claim 16, wherein the simulated organ is a heart model,
the heart model has a main body of heart and coronary arteries laid along a surface of the main body of heart, and
the vascular part is a coronary artery part.

22. The organ model for a catheter simulator according to claim 21, wherein the heart model has an aorta protruding toward an interior of the main body of heart; and an aortic valve positioned at a tip of the aorta.

23. The organ model for a catheter simulator according to claim 16, wherein at least one of the auxiliary part or the vascular part includes a small hole or a slit continuing from a gap between an outer surface of a diseased portion and the inner surface of the vascular part, or the small hole and the slit.

24. The organ model for a catheter simulator according to claim 16, wherein a flange protruding in a diameter direction along a circumferential direction is formed in any one of edges of the auxiliary part.

* * * * *